E. LEONARD.
Grain-Drills.

No. 154,875. Patented Sept. 8, 1874.

WITNESSES:
Thos. Jewett
Wm. E. Chaffee

INVENTOR.
Ezra Leonard
by Daniel Breed Att'y

UNITED STATES PATENT OFFICE.

EZRA LEONARD, OF AKRON, OHIO.

IMPROVEMENT IN GRAIN-DRILLS.

Specification forming part of Letters Patent No. 154,875, dated September 8, 1874; application filed January 16, 1874.

*To all whom it may concern:*

Be it known that I, EZRA LEONARD, of Akron, county of Summit and State of Ohio, have invented a Combined Cultivator, Seed-Sower, and Roller, of which the following is a specification:

The nature of my invention relates to an improvement in a combined grass-cultivator, seed-sower, and roller; and it consists in the arrangement and combination of devices, which will be more fully described hereafter.

Figure 1:
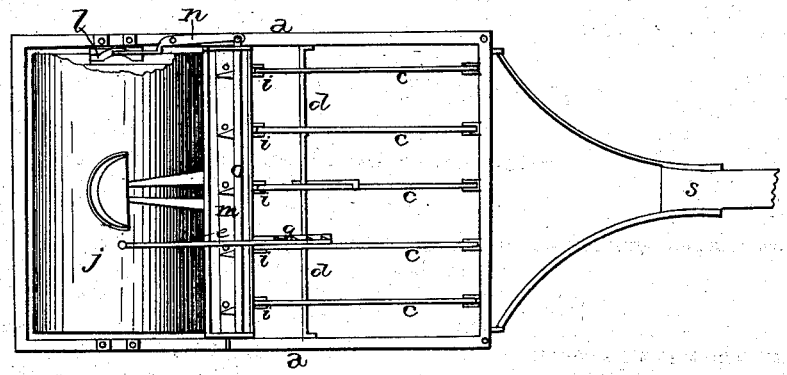
Figure 2:
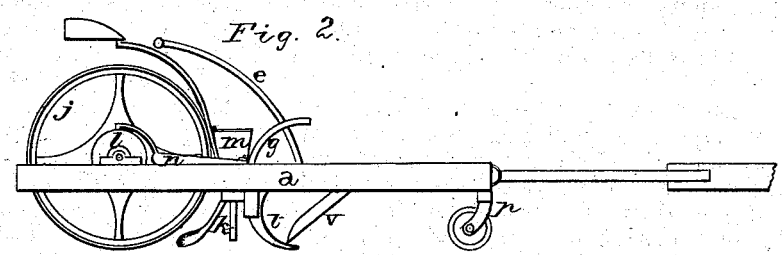
Figure 3:
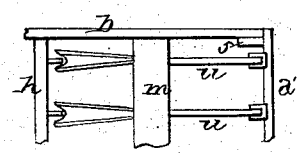

Figure 1 represents a plan view of my invention; Fig. 2, a side elevation of the same; Fig. 3, a detail view of the same.

$a$ represents an oblong rectangular frame, constructed of any suitable material. Pivoted to the inside of the front end of this frame are a number of cultivator-beams, $c$, which are raised from and lowered to any desired depth in the ground by means of the cranked or bent rod $d$, provided with the operating-lever $e$, which is held in any desired position by means of the ratchet $g$. The rear curved ends of the beams are held in position, so as to prevent any lateral movement, by the guides $i$, secured to the front side of the cross-bar $h$, which also serves as a support for the grain-tubes $k$. Journaled in the rear end of the frame is the roller $j$, which has a grooved cam, $l$, on one end, in which the forked ends of the pivoted lever $n$ catch, so as to vibrate the stirrer $o$ in the seed-box $m$ back and forth.

When the machine is used for cultivating grass, the front end of the frame $a$ is supported upon the casters $p$, and provided with the pivoted tongue $s$, and in front of the hoes $t$ are placed any suitable number of colters, $v$, which cut the sod, and prevent the hoes from turning or rolling it up.

When the machine is to be used as a seed-drill, the casters are taken off, a stiff tongue, secured to a clip on the front of the frame, is attached, the grass-hoes removed, and the beams $u$ substituted in their place, and the seed-box moved forward in front of the hoes. The beams $u$ are provided with a break-pin, 2, and have their rear ends open on the rear sides, so as to straddle over a guide, which keeps them in position, and either weights or springs may be used to keep them pressed downward into the earth.

When used as a seed-drill alone, the front cross-bar $a'$ of the frame will be made of iron, having elbows 5, which project backward, and to which the wooden side bars $b$ are secured. There will also be a coverer of any kind, which will follow behind the drills and cover up the grain.

Having thus described my invention, I claim—

In a seed-sower, the frame $a$, roller $j$, and drag-beams $c$, in combination with the guides $i$, lever $e$, lifting-rod $d$, and ratchet $g$, substantially as set forth.

EZRA LEONARD.

Witnesses:
DANIEL BREED,
J. TYLER POWELL.